July 4, 1967  B. W. NICKERSON, JR  3,329,191

TRACTION BOOT

Filed July 26, 1965  2 Sheets-Sheet 1

INVENTOR.
BRYAN W. NICKERSON JR.
BY
Woodling Krost Granger + Rust
Attys.

July 4, 1967  B. W. NICKERSON, JR  3,329,191
TRACTION BOOT
Filed July 26, 1965  2 Sheets-Sheet 2

INVENTOR.
BRYAN W. NICKERSON JR.
BY
Woodling Krost Granger + Rust
attys.

United States Patent Office 3,329,191
Patented July 4, 1967

3,329,191
TRACTION BOOT
Bryan W. Nickerson, Jr., 200 Lore Ave.,
Hillcrest, Del.
Filed July 26, 1965, Ser. No. 474,571
10 Claims. (Cl. 152—239)

The present invention relates in general to traction boots and more particularly to such devices utilizable with conventional snow chains or equivalent devices.

An object of the present invention is to provide a traction boot for use with conventional snow chains or equivalent devices which will increase traction by increasing the traction bulk without proportionately increasing the amount of thump when rolled over by the vehicle wheel.

Another object of the present invention is to provide a traction boot for use with conventional snow chains or equivalent devices which will prolong the life of the chains particularly when used on hard, dry, driving surfaces.

Another object of the present invention is to provide a traction boot for use with conventional snow chains or equivalent devices which is susceptible of mass production resulting in a small unit cost.

Another object of the present invention is to provide a traction boot for use with conventional snow chains or equivalent devices which is quickly and conveniently attached.

Other objects and a fuller understanding of this invention may be had by referring to the following description and claims, taken in conjunction with the accompanying drawings, in which:

Figure 1:
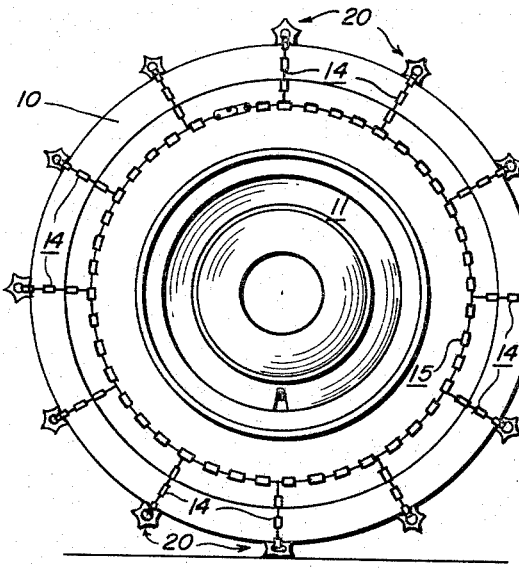
FIGURE 1 is a side elevational view of a vehicle wheel including snow chains embodying the teachings of the present invention.

Referring to FIGURE 1, there is seen a conventional wheel assembly for a vehicle in this particular embodiment an automobile, and this includes a tire 10 mounted upon a conventional rim 11. The tire 10 carries a conventional snow chain which includes a plurality of cross chains or members 14 interconnected at their ends by circumferential chains 15, only one of which is seen in this view. Each of the cross chains 14 has applied thereto a traction boot 20 constructed under the teachings of the present invention.

Figure 2:
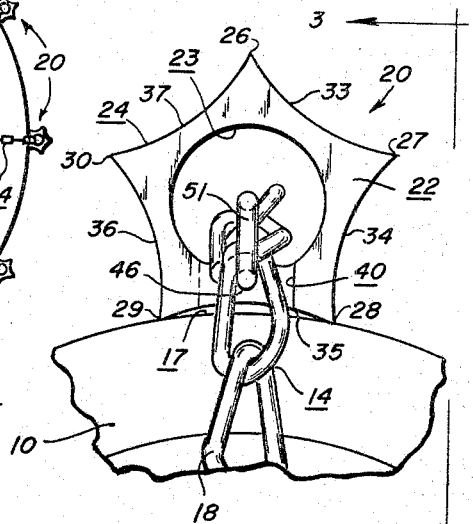
FIGURE 2 is an enlarged fragmentary view of a portion of the structure shown in FIGURE 1.
Figure 3:
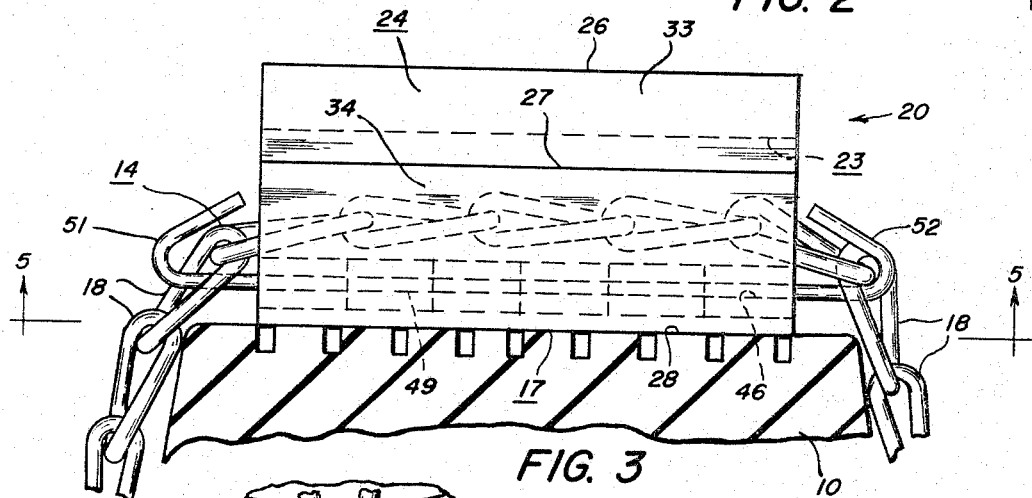
FIGURE 3 is a view taken generally along the line 3—3 of FIGURE 2.
Figure 5:
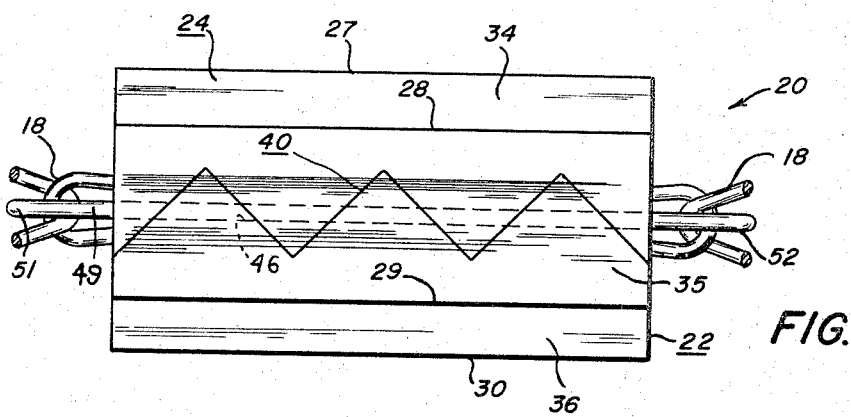
FIGURE 5 is a view taken generally along the line 5—5 of FIGURE 3.

Each of the traction boots which are seen in FIGURE 1 are of the same construction and as a result, only one of these will be specifically described hereinafter. Each of the traction boots 20 includes an integral elongated elastic member, preferably constructed of rubber or equivalent material which has a length which is on the order of the width of the tire tread area 17 with which it is adapted to cooperate (see FIGURE 3). The elastic member comprises an annular wall 22 which has an inner surface 23 which defines an opening which extends axially completely therethrough so as to receive the cross chain or member 14 which is constructed in a conventional manner of a plurality of links 18 connected together as shown in a manner well known to those skilled in the art. As seen in FIGURE 2, the elastic member has a cross section with the outer surface 24 or the outside peripheral shape thereof forming substantially equidistantly spaced peaks numbered 26 through 30 respectively. Adjacent ones of the peaks are connected by concave surfaces which have been numbered 33 through 37, respectively, and it will be noted in this embodiment that there are specifically five peaks and five concave surfaces. It will be noted in FIGURE 2 that the two peaks 28 and 29 are shown in engagement with the tire tread area 17 whereas the peak 26 extends in what may be referred to as a generally radial direction both with respect of the tire 10 as well as with respect to the axis of the elastic member. As best seen in FIGURE 5, a first wall means 40 is provided which defines a cut which extends through the annular wall 22 from the outer surface 24 to the inner surface 23 and also extends the complete axial length of the elastic member. This cut 40 extends in what may be referred to as a zig-zag direction. The purpose of this cut is to provide a convenient means for placing the cross chains within the axial opening which extends through the elastic member. Second wall means 46, which define a locking opening, are provided in the annular wall 22 as seen and this locking opening extends axially through this annular wall the complete length of the elastic member. Because of the zig-zag nature of the cut 40 the opening 46 passes through the wall means on either side of the cut several times. A wire locking member 49 extends through the locking opening 46 to secure the wall means 40 together on either side of the cut and to hold the elastic member in its, what may be referred to as closed condition. The locking member 49 has end portions 51 and 52 which serve to prevent the accidental removal of the wire locking member and as will be noted in FIGURE 3, these ends may also be interconnected with the cross chain to additionally help prevent loss of the locking member 49 and also to aid in the lateral positioning of the elastic member. The locking member is smaller than the opening 46 and this opening because of its size and the material of construction of the same as well as of the locking member permits the end portions 51 and 52 to pass through the opening.

Figure 6:
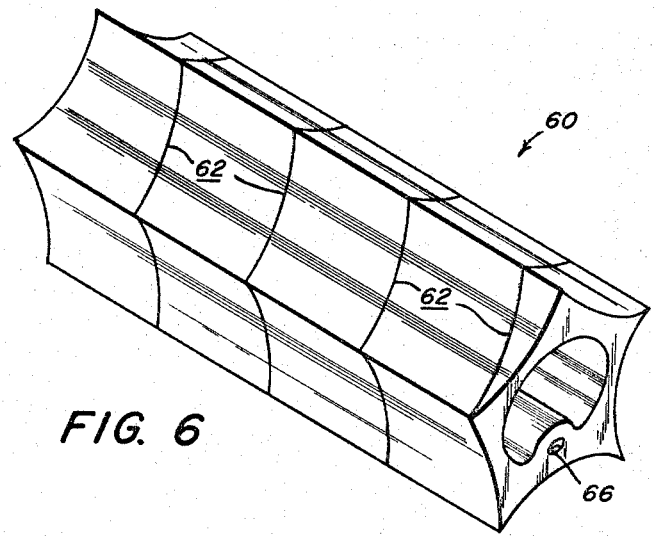
FIGURE 6 is an isometric view of a modified form of the traction boot constructed under the teachings of the present invention.

FIGURE 6 illustrates another form of the traction boot and the traction boot in this embodiment has been designated by the reference numeral 60. This traction boot has the same cross sectional shape as the traction boot 20 and the only difference in this construction is in the means provided for opening the boot so as to receive a cross chain. In this embodiment, wall means 62 are provided to produce a cut which extends through the annular wall of the traction boot and which also extends the complete axial length thereof, however, the cut extends in what may be referred to as a helical direction. In other words, this traction boot which is also preferably compounded of rubber or other suitable elastic material is simply unwound as one would unwind a spring, and wrapped around a cross chain and when so wrapped around again assumes the position shown in FIGURE 6. This embodiment has also been provided with a locking opening 66, however, it is possible in this embodiment if the materials of construction are properly selected, to make the elastic material stiff enough so as to prevent its removal from a cross chain, without the use of a locking member extending through the locking opening 66.

The cuts 40 shown in the embodiment of FIGURES 1 through 5 and the helically extending cuts 62 shown in the embodiment of FIGURE 6, will be appreciated by those skilled in the art as being a novel and convenient means of applying the traction boot to the cross chains of conventional automobile snow chains. It will become readily apparent, however, that no such cut will actually have to be provided assuming either that the snow boots are placed on the cross chains when the snow chains are originally constructed, or in the event one utilizing the snow boot desired to disconnect the one end of the cross chain or member 14 from a circumferential chain 15 in which instance a snow boot could be slipped on which did not utilize a cut to open the same.

Figure 4:
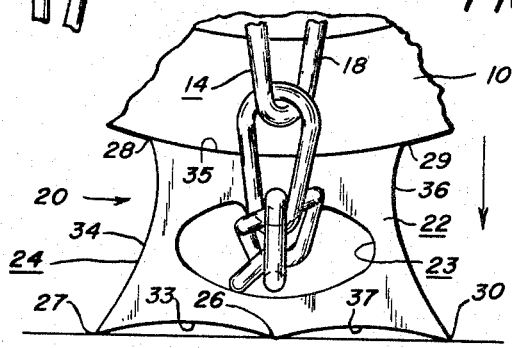
FIGURE 4 is a view similar to FIGURE 2 but showing the traction boot of the present invention collapsed between the vehicle tire and the road surface.

In operation, the cross sectional shape and the position of the snow boot in its positions other than collapsed between the tire and a road surface is shown in FIGURE 2. However, as the tire rolls over the snow boot at its bottom position which is shown in FIGURE 4, it will be seen that the boot is collapsed with peaks 28 and 29 in engagement with the tire tread area and with the peaks 27, 26 and 30 in engagement with the road surface. The amount the snow boot is collapsed or flattened will depend on various factors including the material of construction of the snow boot. Further, from the foregoing it becomes apparent that the term, ground, as used herein, shall be taken to mean a clear dry road surface or include a covering of snow. The meaning of the term will range from low density such as may be found in light fluffy snow to high density such as one finds in hard packed snow or including a clear dry road. It would follow, then, that the lower the density such as found in light fluffy snow the greater the bulk (cross sectional size) required in traction devices in order to give the necessary traction. Conversely, as the density of the ground material increases the bulk (cross sectional size) required decreases proportionately until a condition is reached wherein a hard clear road surface needs no traction giving bulk. On the contrary, a minimum of bulk is desirable at this point to minimize the thump.

The traction boot of the present invention can, because of its inherent collapsible nature and responsiveness to changes in ground density, provide traction giving bulk in amounts heretofore unattainable while the same structure adapts itself to provide almost no bulk when fully collapsed. In addition, as the ground density changes from light fluffy snow to hard packed snow, the traction boot instantly and automatically adjusts itself to the right amount of traction giving bulk necessary to do the job. This, and the amount of bulk possible herewith, without adversely affecting dry road performance, is a substantial departure and advance over prior efforts. As the tire passes over the boot it is released from its collapsed state and expands radially returning to its normal shape. The snow boot is aided in this function by the peaks that are flattened by the collapsing action of the tire passing over the boot. These forces aid the centrifugal force which helps maintain the snow boot in position and which aids in overcoming a tendency of the boot to creep around to the side of the tire. Any structure or modification of the snow boot, whether by internal axial opening or external protrusions, if collapsible to provide the hereinafter mentioned ratio, is within the scope of the present invention.

The various advantages of the present invention will become apparent to those skilled in the art reviewing the present disclosure and the advantages include the fact that the snow boots are utilizable or combinable with present snow chain constructions without modifying the snow chains and the snow boot is readily attachable thereto. The present construction is readily susceptible of mass production by extrusion thereby reducing the unit cost of the same. The inherent nature of the device also eliminates in most instances the need for conventional chain tighteners which, as those skilled in the art will appreciate, in most instances amounted to elastic or rubber type connection means connected to various points of a circumferential chain 15 tending to draw the chain toward the axis of the rotating wheel. The snow boot is adapted to support or space the cross or transverse member from the ground and the boot is characterized by having a cross-sectional shape that is collapsible between the vehicle tire or wheel and the hard surface of the ground. This provides a ratio of soft surface cross-section to hard surface cross-section in which traction giving bulk results without increasing an equivalent amount of thump producing bulk. In the prior art it has been found impossible to increase the traction without also increasing the amount of rise off the road which in turn resulted in a more pronounced jar or thump. Actual tests of a construction in accordance with the teachings of the present invention indicate a tremendous saving in snow chains because the cross chains do not wear out when the snow boot is utilized, particularly when the snow chains are used on dry hard roads. It will be appreciated by those skilled in the art in addition to the fact that no axially extending cut similar to cut 40 or cut 62 need actually be provided in accordance with the teachings of the present invention, that the external peripheral shape of the snow boot may also assume many shapes and still fall within the teachings of the present invention. For example, the outer surface 24 instead of utilizing the peaks and concave surfaces, might be changed to approach the general configuration of a circle or might be generally oval in shape or any of a number of shapes too numerous to mention herein.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In the combination of a tire mounted on a vehicle rim and having a tire tread area, a snow chain mounted on said tire, said snow chain having cross members traversing said tread area, the improvement of a resilient traction boot supporting said cross members from the ground, the having varying degrees of density, said traction boot characterized in cross-section by defining a collapsibly responsive structure that lends itself to being collapsed between said tire and the ground to a degree proportionate to the density of the ground whereby a self-determining traction boot is provided that in its normal shape and when in low density ground presents greater bulk and more traction, and collapses when on high density ground to minimize bulk and bulk producing thump, said traction boot arranged to instantly and automatically adjust to intermediate variables in ground density.

2. The combination of claim 1 wherein the tire is rotatable, said traction boot having an inner surface and an outer surface, said inner surface defining an opening extending the axial length of said traction boot and arranged to receive the cross member therethrough, whereby said traction boot is slidably mounted on said cross member in a position contiguous the tire tread area, the tire exerting a centrifugal force on the traction boot when the tire is rotated, said traction boot exerting a force in a radial direction when released from the collapsed position between the tire and the ground thereby aiding the centrifugal force of the tire and coacting therewith to maintain the axial position of the traction boot.

3. The combination of claim 2 wherein said traction boot is arranged to separate said cross member from said tire in a resilient manner whereby said traction boot absorbs slack in said cross member thereby eliminating the need for chain tighteners.

4. The combination of claim 2 wherein said traction boot has a first wall means defining a cut of a helical nature extending between said inner surface and said outer surface and extending the axial length of said traction boot.

5. The combination of claim 4 wherein said traction boot has a second wall means defining a locking opening, said cut traversing said locking opening, a wire member extending through said locking opening securing said first wall means together.

6. The combination of claim 2 wherein said traction boot has a first wall means defining a cut of a zig-zag nature extending between the inner surface and the outer surface and extending the axial length of said traction boot, said traction boot having a second wall means defining a locking opening, said cut traversing said locking opening, a wire member extending through said locking opening and securing said first wall means together.

7. In the combination of a vehicle tire having a cross member extending laterally across the tire tread area the provision of a traction boot; said traction boot comprising an elongated elastic member, said elongated elastic member comprising an annular wall having an inner surface defining an opening extending axially therethrough, said cross member extending through said opening with said elastic member surrounding said cross member, said cross member occupying only a portion of said opening through said elastic member in its unstressed condition to permit collapsing of said elastic member in a stressed condition, said elastic member being flattened when located between the vehicle tire and a road surface to decrease its cross sectional area and provide protection for said cross member.

8. In a vehicle rubber tire having a snow cross chain extending laterally across the tire tread area the provision of a traction boot; said traction boot comprising an integral elongated rubber member having a length on the order of the width of the tire tread area with which it is adapted to cooperate, said integral elongated rubber member comprising an annular wall having an inner surface defining an opening extending axially therethrough whereby the cross chain may be received therein, said integral elongated rubber member having a cross section with the outside peripheral shape thereof forming substantially equidistantly spaced peaks, adjacent ones of said peaks being connected by concave surfaces with at least one of said peaks being in engagement with the tire tread area and at least one of said peaks extending in a generally radial direction with respect to the rubber tire to engage a road surface, first wall means defining a cut extending through said annular wall from the outer surface to said inner surface thereof and extending the axial length of said integral elongated rubber member to permit opening of said integral elongated rubber member to receive the snow cross chain, second wall means defining a locking opening extending axially through said annular wall and intersecting said first wall means on either side of said cut at least once, a wire member extending through said locking opening to secure said first wall means together on either side of said cut.

9. In a vehicle rubber tire according to claim 8 wherein said cut defined by said first wall means extends in a generally zig-zag direction in traversing said axial length.

10. In a vehicle rubber tire according to claim 8 wherein said cut defined by said first wall means extends in a generally helical direction in traversing said axial length.

References Cited

UNITED STATES PATENTS 2,330,839 10/1943 O'Brien.
2,740,449 4/1956 Erving _____ 152—239

ARTHUR L. LA POINT, *Primary Examiner.*

C. W. HAEFELE, *Assistant Examiner.*